(12) United States Patent  (10) Patent No.: US 8,749,830 B2
Fisher et al.  (45) Date of Patent: Jun. 10, 2014

(54) VERIFICATION OF A PRINTER CALIBRATION UTILIZING HAND-HELD MOBILE DEVICES

(75) Inventors: Ward I. Fisher, Lafayette, CO (US); Edward Hattenberger, Firestone, CO (US); Nenad Rijavec, Longmont, CO (US)

(73) Assignee: Ricoh Production Print Solutions, Boulder, CO (US)

( * ) Notice: Subject to any disclaimer, the term of this patent is extended or adjusted under 35 U.S.C. 154(b) by 186 days.

(21) Appl. No.: 13/547,350

(22) Filed: Jul. 12, 2012

(65) Prior Publication Data

US 2014/0016156 A1  Jan. 16, 2014

(51) Int. Cl.
*G06F 3/12* (2006.01)
*H04N 1/46* (2006.01)

(52) U.S. Cl.
USPC ......... 358/1.15; 358/1.2; 358/1.12; 358/1.13; 358/1.14; 358/1.16; 358/1.18; 358/504; 348/135; 348/211.2

(58) Field of Classification Search
None
See application file for complete search history.

(56) References Cited

U.S. PATENT DOCUMENTS

| | | | |
|---|---|---|---|
| 2005/0185049 A1* | 8/2005 | Iwai et al. | 348/47 |
| 2007/0024928 A1* | 2/2007 | Ono | 358/504 |
| 2007/0086654 A1* | 4/2007 | James | 382/186 |
| 2007/0133052 A1 | 6/2007 | Yamada et al. | |
| 2007/0245233 A1 | 10/2007 | Kim | |
| 2010/0014131 A1* | 1/2010 | Cho | 358/504 |
| 2010/0277751 A1 | 11/2010 | Quach | |
| 2010/0289835 A1 | 11/2010 | Holub | |
| 2010/0289845 A1 | 11/2010 | Conway et al. | |
| 2011/0085204 A1* | 4/2011 | Hamada et al. | 358/1.15 |
| 2011/0141326 A1* | 6/2011 | Ishida | 348/254 |
| 2011/0141491 A1* | 6/2011 | Kuo et al. | 358/1.2 |

FOREIGN PATENT DOCUMENTS

JP  2008125093  5/2008

\* cited by examiner

*Primary Examiner* — Miya J Cato
(74) *Attorney, Agent, or Firm* — Duft Bornsen & Fettig, LLP

(57) ABSTRACT

Methods and systems herein provide for verification of a calibration of a printer utilizing a hand-held mobile device. In one embodiment, a mobile device includes a camera that captures image data of a calibration target printed by a printing system. The image data is captured in an uncontrolled environment. The mobile device further includes a processor that determines a difference between the uncontrolled environment where the image data was captured and a controlled environment, and adjusts the image data based on the difference. The mobile device then determines whether the printing system is out of calibration based on the adjusted image data.

17 Claims, 6 Drawing Sheets

US 8,749,830 B2

VERIFICATION OF A PRINTER CALIBRATION UTILIZING HAND-HELD MOBILE DEVICES

FIELD OF THE INVENTION

The invention relates to the field of printing systems, and in particular, to the print calibration of a printing system.

BACKGROUND

Printing systems typically include a print controller and one or more print engines. The print controller directs the overall operation of the printing system including, for example, host interfacing, interpretation or rendering of print data, and lower level process control or interface features of the print engines. Host interaction may include appropriate adapters for coupling the printing system to one or more host systems that transmit print jobs to the printing system. The print jobs are generally encoded in the form of a page description language such as PostScript (PS), Printer Control Language (PCL), Intelligent Printer Data Stream (IPDS), etc.

In whatever form the print job may be encoded or formatted, the print controller within the printing system interprets the received information to generate sheetside bitmaps of the print job. The sheetside bitmaps represent the image to be printed on one side of a sheet of a print medium. Each sheetside bitmap generally comprises a 2-dimensional array of picture elements (also referred to as pixels or PELS) that represent a corresponding formatted sheet of the print job. Each pixel may represent an encoded colorant value in accordance with the requirements of the particular print job encoding and the capabilities of the printing system on which the print job is to be printed.

The print controller forwards the sheetside bitmaps to one or more print engines (also referred to as imaging engines or a marking engines). The print engine may be a laser engine, an ink-jet engine, or another type of imaging system that marks the print media based on the sheetside bitmaps.

The output quality for printing systems generally depends on the print engine output characteristics being known and fixed, so that colorant conversions and transfer curves can be constructed in advance. This known state may be referred to as the reference state. In practice, printing systems tend to become un-calibrated due to environmental conditions and operating conditions, and therefore, drift out of calibration over time. This printer drift degrades the output quality of a printed product. Also, the calibration changes needed to correct for the printer drift are generally impossible to predict in advance because they depend on too many factors, both external and internal (e.g., temperature, humidity, printer age, etc.).

Printer drift has usually been solved by periodically recalibrating the printing system. Calibrating a printing system involves printing a set of test patches (also referred to as calibration targets) where the output is known assuming that the printer is in the reference state. The printed patches are then measured such that a calibration system may compare the measured patches to known values of the reference state of the printer to determine whether the printer has drifted (i.e., is out of calibration). The calibration system then uses this information to adjust the transfer curves (i.e., colorant conversion models) such that subsequent output of the printing system can be corrected to that of the printing system in the reference state. However, calibration systems may be expensive and difficult to use.

SUMMARY

Embodiments described herein provide for determining whether a printing system is out of calibration utilizing a hand-held mobile device, such as a smart phone or a Personal Digital Assistant (PDA). In contrast to stand-alone calibration systems, mobile devices are in wide use and easily available to the print user/print operator. However, mobile devices capture images in an uncontrolled environment, such that the image data of calibration targets may include poor or inconsistent lighting, motion blur, skew, optical artifacts from the camera of the mobile device, etc.

In one embodiment, a mobile device captures image data of a calibration target that is printed by a printing system. The mobile device determines a difference between the uncontrolled environment where the image data was captured and a controlled environment, and adjusts the image data based on the difference. The mobile device then determines if the printing system is out of calibration based on the adjusted image data.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
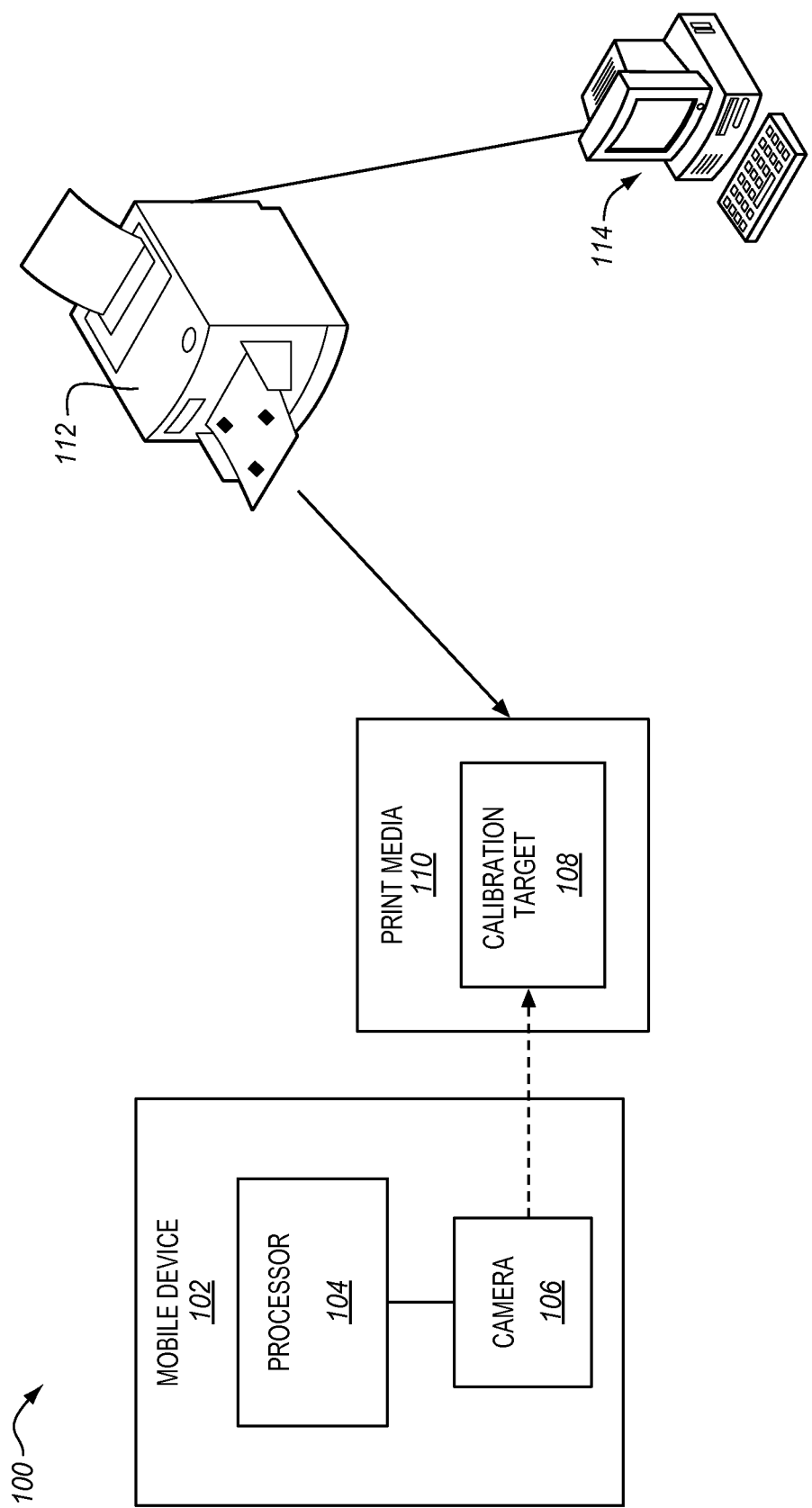
FIG. 1 is a block diagram of a system that includes a mobile device in an exemplary embodiment.

FIG. 1 is a block diagram of a system 100 that includes a mobile device 102 in an exemplary embodiment. The mobile device 102 that may be used to capture image data of a calibration target 108 printed by the printing system 112 in order to determine whether the printing system 112 is out of calibration. Generally, the printing system 112 receives print jobs from a host system 114 for imprinting onto a media, such as media 110. The print jobs may include raw print data in a Page Description Language (PDL), Printer Control Language (PCL), PostScript Data, Intelligent Printer Data Stream (IPDS) data format, etc. Print jobs may also include a job ticket that specifies various characteristics of the print job, such as a type of media to use when printing the job (e.g., size, weight, color, etc.), the number of logical pages per sheet side, which media trays at the printer to pull media from when printing the job, etc. Print jobs received by the printing system 112 are rasterized into bitmap data and provided to a print engine or marking engine. The print engine of printing system 112 then marks the media based on the bitmap data.

The output quality for printing systems generally depends on the print engine output characteristics being known and fixed, so that colorant conversions and transfer curves can be constructed in advance. In practice, printing systems tend to become un-calibrated due to environmental conditions and operating conditions, and therefore, drift out of calibration over time. Printer drift has usually been solved by periodically recalibrating the printing system using a stand-alone calibration system. However, calibration systems are typically expensive and difficult to use.

System 100 determines whether the printing system 112 is out of calibration utilizing the mobile device 102 instead of an expensive stand-alone calibration system. The mobile device 102 may be a smart phone, a PDA, a tablet computer, or some other type of hand-held device in common use by a print user/print operator of the printing system 112. Generally, the mobile device 102 includes at least one processor 104 and a camera 106. The processor 104 includes any component, system, or device that is operable to execute instructions or perform logical operations to determine whether the printing system 112 is out of calibration. The camera 106 includes any component, system, or device that is operable to capture image data for processing by the mobile device 102. In this embodiment, the camera 106 captures image data of the calibration target 108, and the processor 104 determines whether the printing system 112 is out of calibration based on the image data. The particulars of how the mobile device 102 may determine whether the printing system 112 is out of calibration will become readily apparent in the following discussion for FIGS. 2-6.

Figure 2:
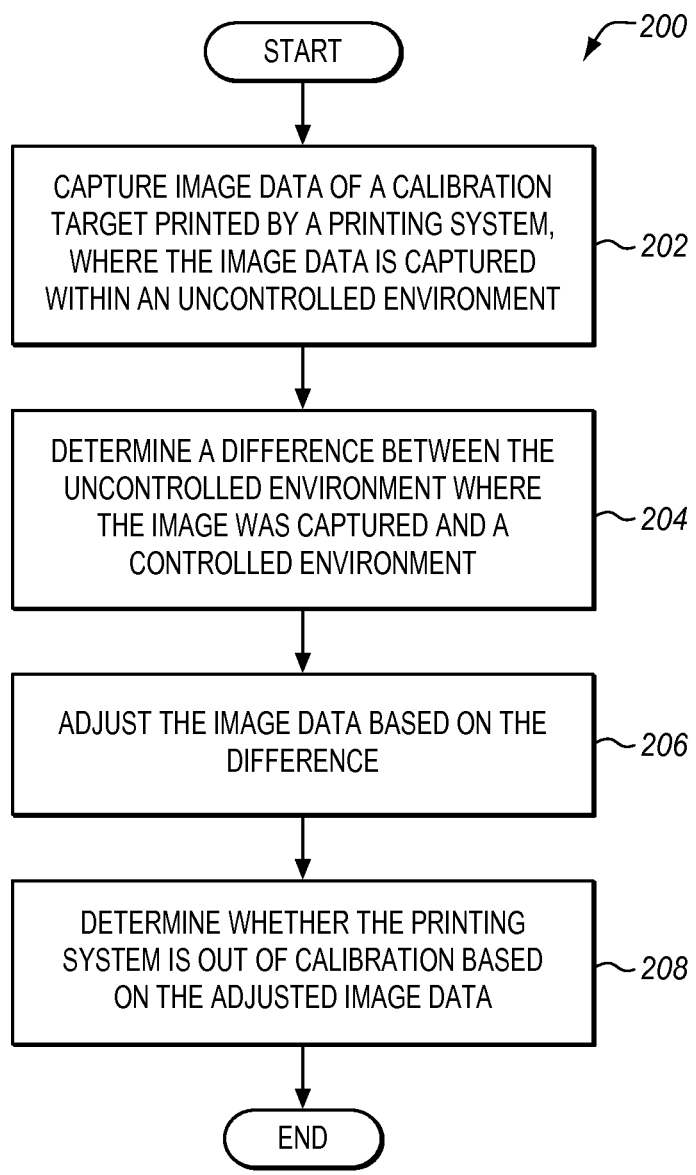
FIG. 2 is flow chart illustrating a method of determining whether a printing system is out of calibration in an exemplary embodiment.

FIG. 2 is flow chart illustrating a method 200 of determining whether the printing system 112 is out of calibration in an exemplary embodiment. The steps of method 200 will be described with respect to system 100 of FIG. 1, although one skilled in the art will understand that method 200 may be performed by other systems not shown. The steps of the methods described herein are not all inclusive and may include other steps not shown. The steps may also be performed in an alternative order.

In some cases, the printing system 112 may drift out of calibration over time. The printing system 112 may drift out of calibration due to mechanical changes in a print engine of the printing system 112, humidity changes in the environment around the printing system 112, temperature changes in the environment around the printing system 112, etc. As such, a user of the mobile device 102 may wish to determine if the printing system 112 is out of calibration. To do so, the user may select a particular calibration file or data to print by the printing system 112. For the calibration file or data to print, the printed output is known assuming that the printer is in the reference state.

In step 202, the camera 106 of the mobile device 102 captures image data of the calibration target 108. In this embodiment, the image data is captured in an uncontrolled environment. As used herein, an uncontrolled environment refers to any image capture environment that the mobile device 102 may be used in, whereby the temperature changes over time, the humidity changes over time, the lighting intensity changes over time and/or space, the skew or physical relationship between the mobile device 102 and the target to capture changes over time, and/or the color temperature of the lighting changes over time. This is in contrast to a controlled environment. As used herein, a controlled environment refers to any image capture environment that a fixed or stationary calibration system may be used in, whereby the temperature does not change over time, the humidity does not change over time, the lighting intensity does not change over time, the skew or physical relationship between the imaging device used to capture target data does not change over time, and/or the color temperature of the lighting does not change over time. When capturing the image data of the calibration target 108, the mobile device 102 may be subject to lighting variations, skew variations, etc. Lighting variations may result from the non-uniform environmental lighting typically found in offices, homes, etc. For example, lighting in a room from a window may present lighter and darker areas across the media 110, may present a varying color temperature, etc. Skew variations may result from the print media 110 not being parallel to the camera 106 when the image data is captured.

In step 204, processor 104 determines a difference between the uncontrolled environment where the image data was captured, and a controlled environment. One skilled in the art of print calibration will easily recognize that any number of differences may exist between the controlled environment of a typical stand-alone calibration system and the uncontrolled environment present when the mobile device 102 captures the image data of the calibration target 108.

In step 206, processor 104 adjusts the image data captured by camera 106 based on the differences. Adjusting the image data may also be known to one skilled in the art as normalizing the image data such that the image data corresponds to a known lighting (both in intensity and color temperature), to a known or minimal skew typical of the perpendicular camera mounting in a stand-alone calibration system, etc.

In step 208, the processor 104 determines whether the printing system 112 is out of calibration based on the image data as adjusted. To make this determination, the processor 104 may compare reference data for the calibration target 108 with the adjusted image data. The reference data for the calibration target 108 represents the expected printed output of the printing system 112 when the printing system 112 is in the reference or calibrated state. Thus, differences between the reference data and the adjusted image data are representative of how far out of calibration the printing system 112 is with respect to the reference or calibrated state.

In some embodiments, if the mobile device 102 determines that the printing system 112 is out of calibration, then the mobile device 102 may then calculate a new colorant calibration model for the printing system 112, and upload the new calibration model to the printing system 112 over a network, such as a wireless network. The printing system 112 may then use the new calibration model to improve the accuracy of the printed output generated by the printing system 112. Also, while the mobile device 102 may be able to determine that the printing system 112 is out of calibration, the mobile device may not be able to generate a new calibration model for the printing system 112. This may occur in cases where the image capture capability of the mobile device 102 is less than is needed to allow for an accurate calibration model to be generated. In this case, the mobile device 102 may indicate such to the user, and instruct the user to use a different device to perform the calibration process for printing system 112.

Figure 3:
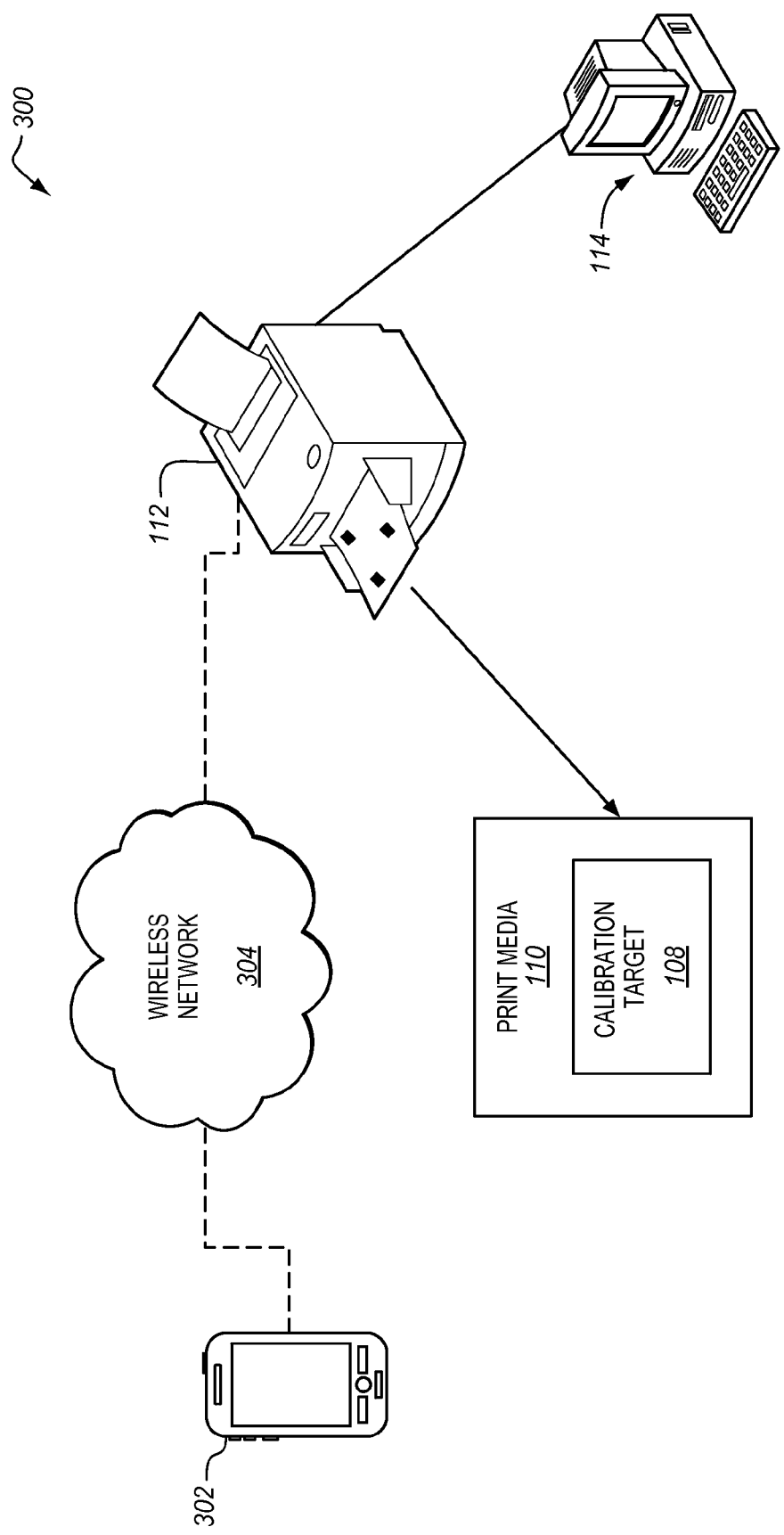
FIG. 3 is a block diagram of another system that includes another mobile device in an exemplary embodiment.

FIG. 3 is a block diagram of another system 300 that includes another mobile device in an exemplary embodiment. In this embodiment, the mobile device is a smartphone 302 that communicates with the printing system 112 over a wireless network 304 in order to coordinate the calibration process with the printing system 112. Some examples of the wireless network 304 includes CDMA®, Bluetooth®, WiMAX®, Wi-Fi®, GSM®, and ANT®, etc. Coordinating the calibration process with the printing system 112 may include having the smartphone 302 instruct the printing system 112 to print specific calibration targets 108, having the smart phone 302 instruct the printing system 112 to print a calibration target on a particular print media, having the smart phone 302 upload new calibration data to the printing system 112 in response to the smartphone 302 determining that the printing system 112 is out of calibration, etc. One example of the smartphone 302 is the HTC EVO 4G®, which includes a capacitive touch screen display, a 1 GHz processor, an 8 megapixel rear-facing camera, and a number of wireless interfaces including Wi-Fi®, CDMA®, Bluetooth®, and WiMAX®. However, one skilled in the art will recognize that smartphone 302 may include nearly any hand-held telecommunication device that includes at least a processor and a digital camera.

Figure 4:
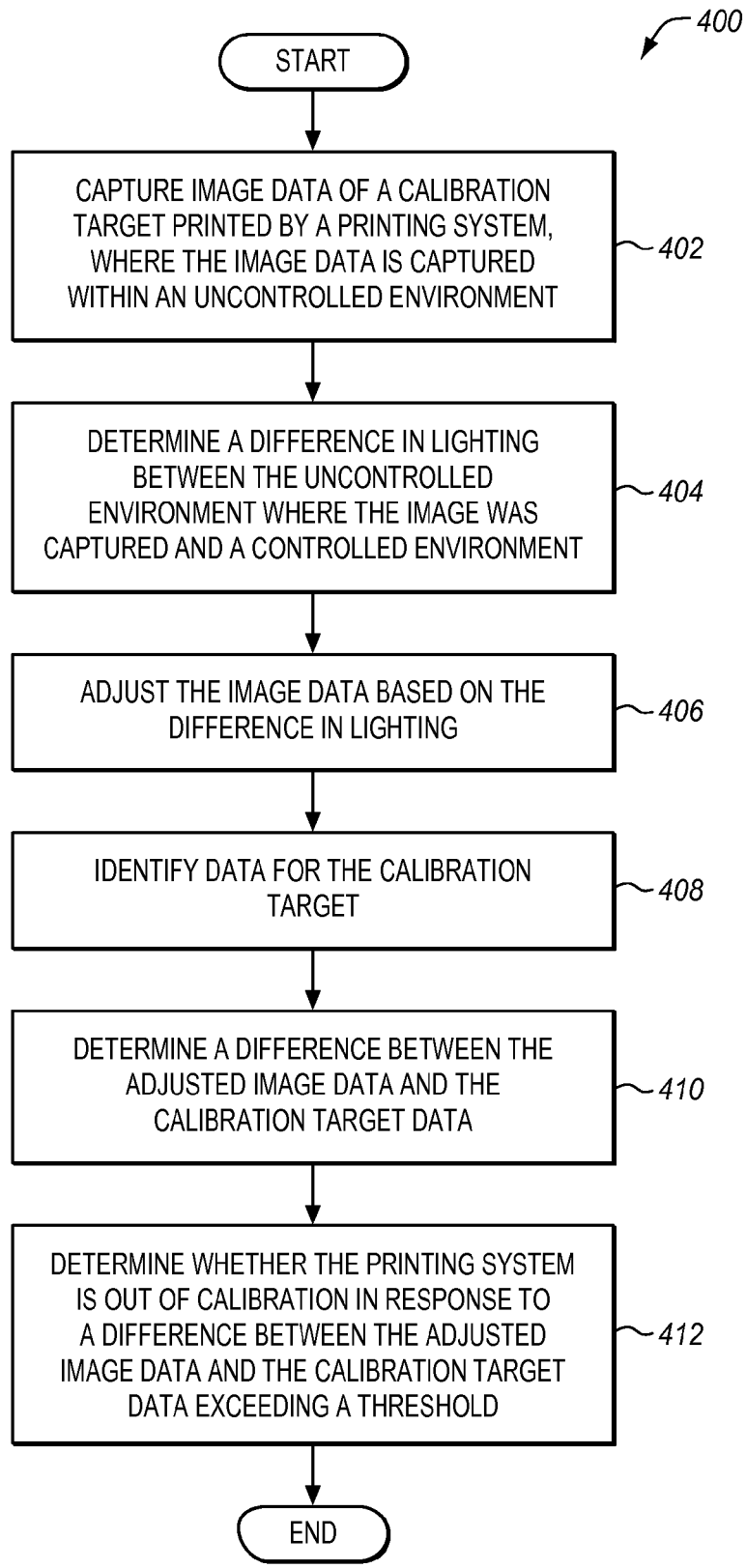
FIG. 4 is a flow chart illustrating another method of determining whether a printing system is out of calibration in an exemplary embodiment.

FIG. 4 is a flow chart illustrating another method 400 of determining whether the printing system 112 is out of calibration in an exemplary embodiment. In step 402, the smartphone 302 captures image data of the calibration target 108, where the image data is captured within an uncontrolled environment. For instance, smartphone 302 may instruct the printing system 112 to print the calibration target 108 on the media 110, and display instructions to a user of the smartphone 302 to use a built-in camera to capture an image of the printed calibration target 108.

In step 404, smartphone 302 determines a difference in lighting between the uncontrolled environment of the smartphone 302 and a controlled environment, such as may be present in a stand-alone calibration system, at the time the image data was captured by the smartphone 302. To determine the difference in lighting, the smartphone 302 may first identify a color space of the media 110. If the media 110 is substantially white, then the color space of the media 110 may be represented by the brightness rating and coatings applied to the media 110. For instance, the smartphone 302 may query the printing system 112 over the wireless network 304 for the brightness and/or coatings on media used in printing the calibration target 108. The smartphone 302 may also instruct the user to scan a barcode on the packaging for the media 110. Using the barcode, the smartphone 302 may perform a lookup on the characteristics of the media 110, such as by performing an internet query for the characteristics of the media 110. In some cases, the smartphone 302 may capture image data of a blank portion of the media 110 to determine the color space of the media 110. For example, the smartphone 302 may instruct the user to place the smartphone 302 onto a blank piece of the media 110, and then use a built-in flash and the built-in camera to capture image data for the blank portion of the media. Using this image data, the smartphone 302 may estimate the color space of the media 110 for use in determining the differences in lighting between the uncontrolled environment of the smartphone 302 and the controlled environment. In response to determining the color space of the media 110, the smartphone 302 may then compare the lighting values of the image data captured for the calibration target 108 to an expected set of lighting values for the image data that may be generated under ideal lighting conditions. In this embodiment, the ideal lighting conditions as applied to the media 110 may correspond to a known color temperature and/or luminosity applied to the media 110.

In step 406, the smartphone 302 adjusts the image data based on the difference in lighting. Such adjustments to the image data may include shifting the color temperature of the image data, shifting the brightness of pixels in the image data, etc., in order to transform the image data from the uncontrolled environment at the time the image data was captured to the controlled environment.

In step 408, the smartphone 302 identifies data for the calibration target 108. The calibration target may include various colors, patterns, and/or changes in colorant density that is used to represent known steps or transitions of colorant as made by a marking engine of the printing system 112. Thus, data for the calibration target 108 may represent the expected or ideal data that would be captured by the smartphone 302 if the printing system 112 were in the reference or calibrated state. In order to identify data the calibration target 108, the smartphone 302 may present options to the user to identify the calibration target 108 printed by the printing system 112. For instance, the smartphone 302 may have 20 or so calibration targets stored in memory, and present the user with one or two options to choose from. The smartphone 302 may also query the printing system 112 over the wireless network 304 for the calibration target that was printed by the printing system 112. In response to identifying the correct calibration target 108, the smartphone 302 may then identify sets of data associated with the calibration target 108.

In step 410, the smartphone 302 determines a difference between the adjusted image data and the calibration target data. In step 412, the smartphone 302 determines whether the printing system 112 is out of calibration in response to a difference between the adjusted image data and the data for the calibration target 108 exceeding a threshold. For instance, data for a patch of colorant on the calibration target 108 may represent the values that are expected when the printing system 112 is calibrated. Thus, differences between the adjusted image data values actually captured by the smartphone 302 and the data for the patch of colorant are representative of how well or accurately the printing system 112 is representing the print data. When the difference exceeds a threshold, then the smartphone 302 may determine that the printing system 112 is not calibrated correctly and therefore, the printing system 112 is not accurately representing the print data.

Figure 5:
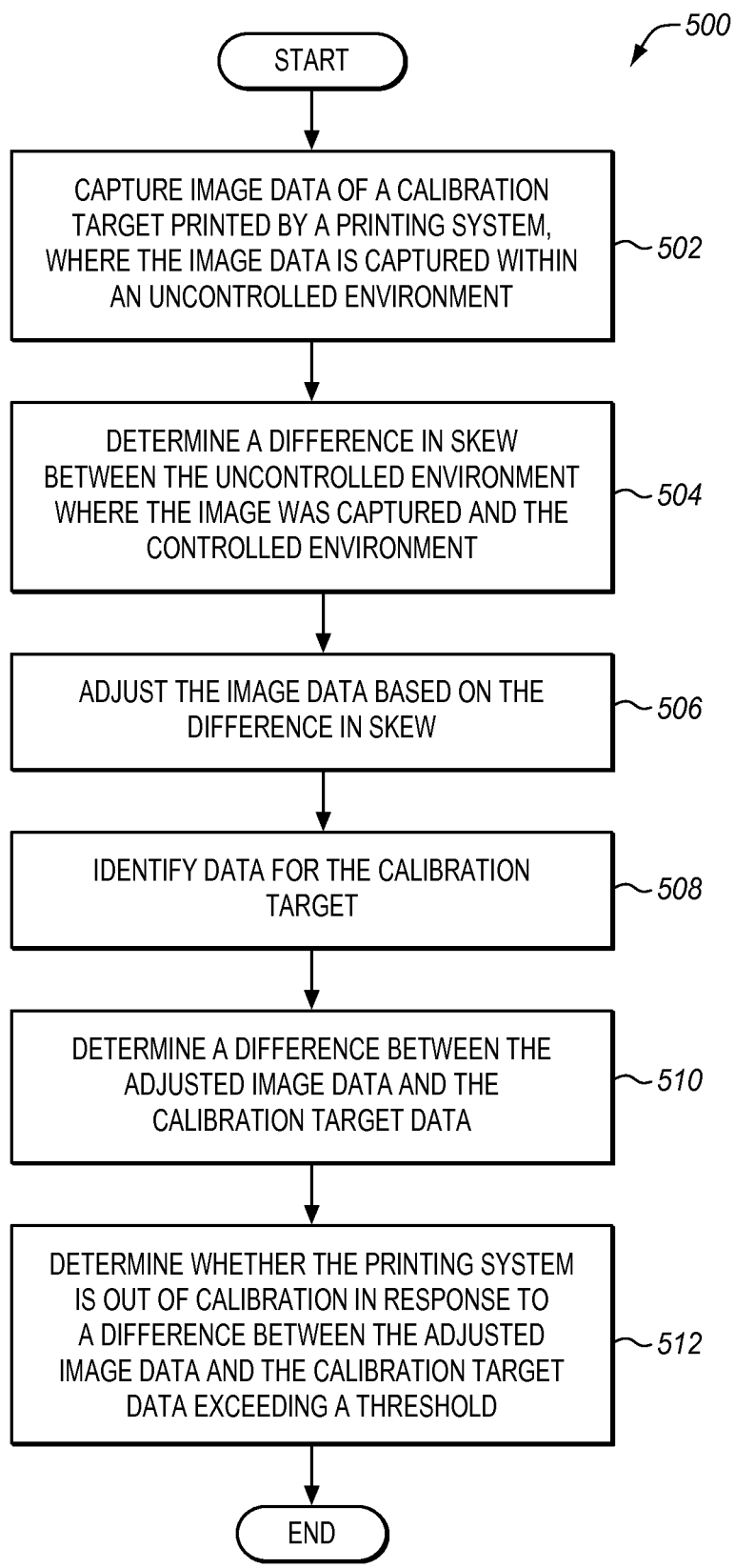
FIG. 5 is a flow chart illustrating another method of determining whether a printing system is out of calibration in an exemplary embodiment.

FIG. 5 is a flow chart illustrating another method 500 of determining whether the printing system 112 is out of calibration in an exemplary embodiment. In step 502, the smartphone 302 captures image data of the calibration target 108, where the image data is captured within an uncontrolled environment.

In step 504, the smartphone 302 determines a difference in skew between the uncontrolled environment of the smartphone 302 and a controlled environment, such as may be present in a stand-alone calibration system, at the time the image data was captured by the smartphone 302. Generally, the skew results from the media 110 being imaged at an angle relative to a plane of the surface of the media 110. For example, a user may place the media 110 on a table and capture the image data using the smartphone 302 at an orientation relative to the plane of the media 110 that is not parallel and directly over the media 110. This orientation results in a skew, or perspective change for the calibration target 108.

To determine the difference in skew, the smartphone 302 may first identify a physical orientation of the media 110, such as the size of the media 110. For instance, the smartphone 302 may query the printing system 112 over the wireless network 304 for the size media used in printing the calibration target 108. In some cases, the smartphone 302 may present options on a display to allow a user to select the size of the media. In response to determining the size of the media 110, the smartphone 302 may then compare the skew information present in the image data captured for the calibration target 108 to an expected set of skew values for the image data that may be generated under ideal imaging conditions. In this embodiment, the ideal imaging conditions as applied to the media 110 may correspond to capturing the image data at an orientation that is substantially parallel and directly above the surface of the media 110.

In step 506, the smartphone 302 adjusts the image data based on the difference in skew. Such adjustments to the image day may include rotating the image data in order to transform the image data from the uncontrolled environment at the time the image data was captured to the controlled environment.

In step 508, the smartphone 302 identifies data for the calibration target 108. This step may be substantially the same as previously described for step 408. In step 510, the smartphone 302 determines a difference between the adjusted image data and the calibration target data.

In step 510, the smartphone 302 determines whether the printing system 112 is out of calibration in response to a difference between the adjusted image data and the data for the calibration target 108 exceeding a threshold. When the difference exceeds a threshold, then the smartphone 302 may determine that the printing system 112 is not calibrated correctly and therefore, the printing system 112 is not accurately representing the print data.

In some embodiments, the smartphone 302 may be able to compensate for a motion of the smartphone 302 when capturing the image data in order to reduce a blur of the captured image. A mobile device, such as the smartphone 302, is generally held in the hand of the user during the image capture process, which may introduce motion artifacts in the data captured by the smartphone 302. This is in contrast to a stand-alone calibration system where the camera does not move relative to the printed calibration target.

In other embodiments, the smartphone 302 may be able to compensate for an optical characteristic of the smartphone 302 in order to reduce optical artifacts, such as a contrast changes, chromatic aberration, distortion, blurring, etc., of the captured image. A mobile device, such as the smartphone 302, is generally a mass produced device, whereby the camera may not have the same optical quality of a stand-alone calibration system. To compensate for such artifacts, the user may be instructed to print and capture images of various test patterns in order for the smartphone 302 to characterize the optical characteristics of the camera. This is in contrast to a stand-alone calibration system where the camera has well controlled optical characteristics.

Using the smartphone 302, a user is provided options to perform a calibration process on the printing system 112 that does not involve expensive calibrations systems that may be difficult to use.

Figure 6:
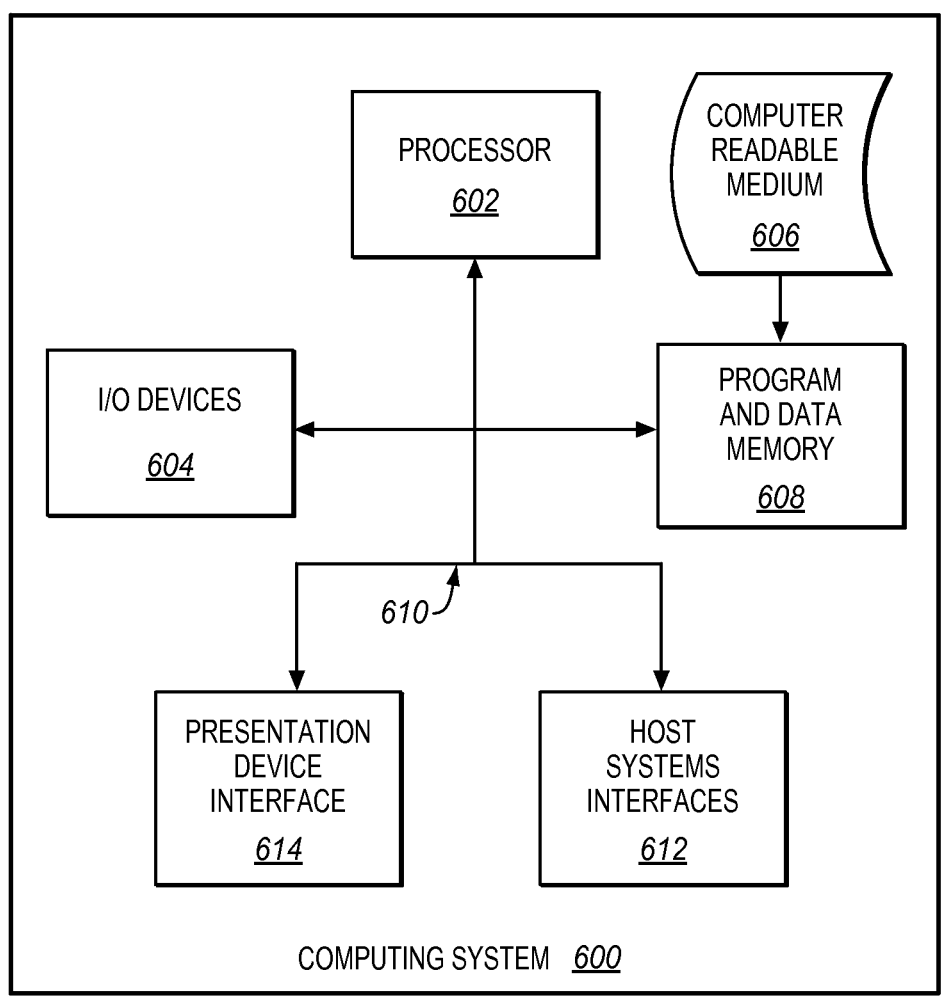
FIG. 6 illustrates a computing system in which a computer readable medium may provide instructions for performing the methods of FIGS. 2, 4, and 5 in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 600 in which a computer readable medium may provide instructions for performing the methods of FIG. 2, FIG. 4, and FIG. 5 in an exemplary embodiment.

Furthermore, the invention can take the form of a computer program product accessible from a computer-usable or computer-readable medium 606 providing program code for use by or in connection with a computer or any instruction execution system. For the purposes of this description, a computer-usable or computer readable medium 606 can be any apparatus that can tangibly store the program for use by or in connection with the instruction execution system, apparatus, or device.

The medium 606 can be any tangible electronic, magnetic, optical, electromagnetic, infrared, or semiconductor system (or apparatus or device). Examples of a computer-readable medium 606 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution.

Input/output or I/O devices 604 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 612, or remote printers or storage devices through intervening private or public networks. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A system comprising:
  a mobile device comprising:
    a camera operable to capture image data of a calibration target printed by a printing system, wherein the image data is captured within an uncontrolled environment;
    a wireless interface that is operable to communicate with the printing system; and
    a processor operable to determine a difference between the uncontrolled environment where the image data was captured and a controlled environment, to adjust the image data based on the difference, and to determine whether the printing system is out of calibration based on the adjusted image data;
    the processor is further operable to calculate a calibration model for the printing system in response to determining that the printing system is out of calibration, and to upload the calibration model over the wireless interface to the printing system for adjusting print characteristics of the printing system.

2. The system of claim 1 wherein:
  the processor is further operable to determine a difference in lighting between the uncontrolled environment where the image data was captured and the controlled environment, and to adjust the image data based on the difference in lighting.

3. The system of claim 2 wherein:
the processor is further operable to determine a color space of a media utilized in printing the calibration target, and to adjust the image data based on the difference in lighting and the color space of the media.

4. The system of claim 3 wherein:
the processor is further operable to capture image data of a blank portion of the media, and to determine the color space of the media based on the image data of the blank portion of the media.

5. The system of claim 1 wherein:
the processor is further operable to determine a difference in skew between the uncontrolled environment where the image data was captured and the controlled environment, and to adjust the image data based on the difference in skew.

6. The system of claim 1 wherein:
the processor is further operable to determine a difference in image stabilization between the uncontrolled environment where the image data was captured and the controlled environment, and to adjust the image data based on the difference in the image stabilization.

7. A method comprising:
capturing, by a camera of a mobile device, image data of a calibration target printed by a printing system, wherein the image data is captured within an uncontrolled environment;
determining, by a processor of a mobile device, a difference between the uncontrolled environment where the image data was captured and a controlled environment;
adjusting, by the processor of the mobile device, the image data based on the difference; and
determining, by the processor of the mobile device, whether the printing system is out of calibration based on the adjusted image data;
calculating, by the processor of the mobile device, a calibration model for the printing system in response to determining that the printing system is out of calibration; and
uploading, over a wireless interface of the mobile device, the calibration model to the printing system for adjusting print characteristics of the printing system.

8. The method of claim 7 wherein:
the step of determining whether the printing system is out of calibration further comprises:
determining a difference in lighting between the uncontrolled environment where the image data was captured and the controlled environment; and
the step of adjusting further comprises:
adjusting the image data based on the difference in lighting.

9. The method of claim 8 wherein:
the method further comprises:
determining a color space of a media utilized in printing the calibration target; and
the step of adjusting further comprises:
adjusting the image data based on the difference in lighting and the color space of the media.

10. The method of claim 9 wherein:
the step of determining the color space of the media further comprises:
capturing image data of a blank portion of the media; and
determining the color space of the media based on the image data of the blank portion of the media.

11. The method of claim 7 wherein:
the step of determining whether the printing system is out of calibration further comprises:
determining a difference in skew between the uncontrolled environment where the image data was captured and the controlled environment; and
the step of adjusting further comprises:
adjusting the image data based on the difference in skew.

12. The method of claim 7 wherein:
the step of determining whether the printing system is out of calibration further comprises:
determining a difference in image stabilization between the uncontrolled environment where the image data was captured and the controlled environment; and
the step of adjusting further comprises:
adjusting the image data based on the difference in the image stabilization.

13. A non-transitory computer readable medium embodying programmed instructions which, when executed by a processor of a mobile device, direct the processor to:
capture, by a camera of the mobile device, image data of a calibration target printed by a printing system, wherein the image data is captured within an uncontrolled environment;
determine a difference between the uncontrolled environment where the image data was captured and a controlled environment;
adjust the image data based on the difference; and
determine whether the printing system is out of calibration based on the adjusted image data;
calculate a calibration model for the printing system in response to determining that the printing system is out of calibration; and
upload, over a wireless interface of the mobile device, the calibration model to the printing system for adjusting print characteristics of the printing system.

14. The non-transitory medium of claim 13 wherein the instructions further direct the processor to:
determine a difference in lighting between the uncontrolled environment where the image data was captured and the controlled environment; and
adjust the image data based on the difference in lighting.

15. The non-transitory medium of claim 14 wherein the instructions further direct the processor to:
determine a color space of a media utilized in printing the calibration target; and
adjust the image data based on the difference in lighting and the color space of the media.

16. The non-transitory medium of claim 15 wherein the instructions further direct the processor to:
capture, by a camera of the mobile device, image data of a blank portion of the media; and
determine the color space of the media based on the image data of the blank portion of the media.

17. The non-transitory medium of claim 13 wherein the instructions further direct the processor to:
determine a difference in skew between the uncontrolled environment where the image data was captured and the controlled environment; and
adjust the image data based on the difference in skew.

* * * * *